United States Patent [19]

Iwata et al.

[11] 4,370,370
[45] Jan. 25, 1983

[54] THERMOSENSITIVE RECORDING ADHESIVE LABEL

[75] Inventors: Susumu Iwata, Shizuoka; Keiichi Maruta, Numazu, both of Japan

[73] Assignee: Ricoh Company, Ltd., Tokyo, Japan

[21] Appl. No.: 271,694

[22] Filed: Jun. 8, 1981

[51] Int. Cl.³ .............................................. B41M 5/18
[52] U.S. Cl. .................................... 428/40; 282/27.5; 428/202; 428/204; 428/320.4; 428/320.8; 428/336; 428/474.4; 428/479.6; 428/484; 428/488; 428/514; 428/522; 428/537; 428/913; 428/914
[58] Field of Search ............... 282/27.5; 427/150-152; 428/40, 343, 346-349, 352, 354, 195, 200, 207, 211, 320.4, 320.6, 320.8, 488, 537, 913, 914, 202-204, 206, 336, 339, 474.4, 479.6, 484, 514, 522; 106/21, 31

[56] References Cited

U.S. PATENT DOCUMENTS 3,539,375 11/1970 Baum .................................... 428/913

Primary Examiner—Bruce H. Hess
Attorney, Agent, or Firm—Oblon, Fisher, Spivak, McClelland & Maier

[57] ABSTRACT

A thermosensitive recording adhesive label comprising: a support sheet; a thermosensitive coloring layer formed on the front side of the support sheet, the thermosensitive coloring layer comprising a colorless or light-colored leuco dye and an acidic material capable of coloring the leuco dye when heat is applied thereto; a front barrier layer formed on the thermosensitive coloring layer, the front barrier layer comprising a polymeric material capable of preventing intrusion of materials which may discolor said thermosensitive coloring layer; a back barrier layer formed on the back side of the support sheet, the back barrier layer comprising a polymeric material capable of preventing intrusion of materials which may discolor the thermosensitive coloring layer; an adhesive layer formed on the back barrier layer; and a disposable backing sheet which is attached to the adhesive layer and can be peeled off the adhesive layer when the thermosensitive recording adhesive label is used.

16 Claims, 2 Drawing Figures

THERMOSENSITIVE RECORDING ADHESIVE LABEL

BACKGROUND OF THE INVENTION

The present invention relates to a thermosensitive recording adhesive label which is capable of performing thermosensitive recording thereon and more particularly to a thermosensitive recording adhesive label capable of retaining recorded images for a long period of time, without being affected by any organic resinous films which happen to come into contact with the label.

Adhesive labels are used for various purposes. For instance, they are attached to commercial products for indicating their names, contents, prices, qualities, etc., or to postal matters for indicating their destinations. Conventionally, those are written by stamping ink or by typing. The stamping method has a shortcoming in that it requires replenishment of ink from time to time, while the typing method has a shortcoming in that used typewriter ribbons have to be replaced by new ribbons from time to time.

Under such circumstances, application of thermosensitive recording to such adhesive labels has been desired, since that application could eliminate the above-mentioned shortcomings of the conventional adhesive labels. However, that, too, heretofore had a significant shortcoming as will now be explained. At present, the most practical thermosensitive recording materials are of a type employing a thermosensitive coloring material comprising a colorless or light-colored leuco dye and an acidic material for coloring the leuco dye when heat is applied thereto, since images produced by the thermosensitive coloring material are clear and do not deteriorate with time, and those thermosensitive recording materials themselves can be stored for a long period of time without fog.

When adhesive labels employing the above-mentioned thermosensitive recording material are used for commercial products, it may occur that the label is covered with a polyvinylchloride resin film or a polypropylene film to protect the image formed on the label, or the label is applied to products covered with the above-mentioned films. In the circumstances, however, in the case of the conventional thermosensitive recording adhesive label, the images formed on the label lose their color and become illegible in about half a day while in contact with the above-mentioned polyvinylchloride resin film or polypropylene film.

The same is true of the thermosensitive recording adhesive labels for use with postal matters. Due to this shortcoming, the thermosensitive recording materials comprising leuco dyes and acidic materials have not been successfully applied to adhesive labels attached to commercial products or postal matters.

SUMMARY OF THE INVENTION

It is therefore an object of the present invention to provide a thermosensitive recording label capable of retaining images formed on the label for a long period of time even if it is continuously in contact with an organic resinous film.

According to the present invention, there is provided a thermosensitive recording adhesive label comprising a support sheet, a back barrier layer formed on the back side of the support sheet, an adhesive layer formed on the back barrier layer, a disposable backing sheet which is attached to the adhesive layer and can be peeled off the adhesive layer when the label is used, a thermosensitive coloring layer formed on the front side of the support sheet and a front barrier layer formed on the thermosensitive coloring layer. The thermosensitive coloring layer comprises a colorless or light-colored leuco dye and an acidic material capable of coloring the leuco dye when heat is applied to the thermosensitive coloring layer. The front barrier layer and the back layer each comprise a water-soluble polymer or a carboxyl-group-modified polyvinyl alcohol, which prevent intrusion of any adverse materials into the thermosensitive coloring layer which may adversely affect the color of the thermosensitive coloring layer.

DRIEF DESCRIPTION OF THE DRAWINGS

DETAILED DESCRIPTION OF THE PREFERRED EMBODIMENTS

Figure 1:
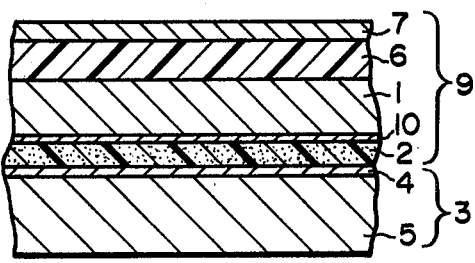
FIG. 1 is a partial cross sectional view of an embodiment of a thermosensitive recording adhesive label according to the present invention.

As mentioned previously, the case of the conventional thermosensitive recording adhesive label, the images formed on the label discolor while in contact with a polyvinylchloride resin film or with polypropylene film, to the extent that they are illegible in about half a day. The inventors of the present invention have discovered that the discoloring of the images formed on the label is caused by plasticizers contained in the films, which plasticizers gradually come out of the films while in contact with the films, since such plasticizers are capable of decomposing the colored materials formed in the thermosensitive recording layer and discoloring the same.

In the present invention, in order to prevent intrusion of such plasticizers into the thermosensitive coloring layer of the thermosensitive recording adhesive label, they are formed two barrier layers for protecting the thermosensitive coloring layer from the plasticizers or other adverse materials in the thermosensitive recording adhesive label. More specifically, an embodiment of thermosensitive recording adhesive film according to the present invention comprises a support sheet, a back barrier layer formed on the back side of the support sheet, an adhesive layer formed on the back barrier layer, a disposable backing sheet which is attached to the adhesive layer and can be peeled off the adhesive layer when the label is used, a thermosensitive coloring layer formed on the front side of the support sheet and a front barrier layer formed on the thermosensitive coloring layer.

As the support sheet, conventional sheet materials, such as paper, synthetic resinuous sheets, and metal-evaporated paper, can be employed.

The thermosensitive coloring layer comprises a leuco dye, an acidic material and a binder agent.

Examples of leuco dyes that can be employed in the present invention are as follows:

(1) Leuco bases of triphenylmethane dyes, such as
3,3-bis(p-dimethylaminophenyl)-phthalide,
3,3-bis(p-dimethylaminophenyl)-6-dimethylaminophthalide (or Crystal Violet Lacton), 3,3-bis(p-dimethylaminophenyl)-6-diethylaminophthalide,
3,3-bis(p-dimethylaminophenyl)-6-chlorophthalide,
3,3-bis(p-dibutylaminophenyl)-phthalide.

(2) Leuco base of fluoran dyes, such as
3-cyclohexylamino-6-chlorofluran,
3-(N,N-diethylamino)-5-methyl-7-(N,N-dibenzylamino)fluoran,
3-dimethylamino-5,7-dimethylfluoran,
3-diethylamino-7-methylfluroran,
3-diethylamino-5-methyl-7-t-butylfluoran.

(3) Fluoran dyes, such as
3-diethylamino-7-chlorofluoran,
3-diethylamino-6-methyl-7-chlorofluoran,
3-pyrrolidino-6-methyl-7-anilinofluoran,
3-dimethylamino-6-methyl-7-anilinofluoran,
2-(N-(3'-trifluromethylphenyl)amino)-6-diethylamino-fluoran,
3-diethylamino-7-cyclohexylaminofluoran,
2-(3,6-bis(diethylamino)-9-(o-chloroanilino)xyanthyl-benzoic acid lactam),
3-dimethylamino-6-methyl-7-p-butylanilinofluoran.

(4) Lacton compounds, such as
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'-nitrophenyl phthalide,
3-(2'-hydroxy-4'-diethylaminophenyl)-3-(2'-methoxy-5'-methylphenyl)phthalide,
3-(2'-methoxy-4'-dimethylaminophenyl)-3-(2'-hydroxy-4'-chloro-5'-methylphenyl)phthalide.

Examples of acidic materials that can be employed in the present invention are as follows:

Boric acid, oxalic acid, maleic acid, tartaric acid, citric acid, succinic acid, benzoic acid, stearic acid, gallic acid, salicylic acid, 1-hydroxy-2-naphthoic acid, o-hydroxybenzoic acid, m-hydroxybenzoic acid, 2-hydroxy-p-toluic acid, 3,5-xylenol, thymol, p-tert-butylphenol, 4-hydroxyphenoxide, methyl-4-hydroxybenzoate, 4-hydroxyacetophenone, α-naphthol, β-naphthol, catechol, resorcin, hydroquinone, 4-tert-octylcatechol, 4,4'-butylidenephenol, 2,2'-dihydroxydiphenyl, 2,2'-methylenebis(4-methyl-6-tert-butyl-phenol), 2,2'-bis(4'-hydroxyphenyl)propane or bisphenol A), 4,4'-isopropylidenebis(2-tert-butylphenol), 4,4'-sec-butylidenediphenol, pyrogallol, phloroglucine, phlorogluocinocarboxylic acid, 4-phenylphenol, 2,2'-methylenebis(4-chlorophenol), 4,4'-isopropylidenediphenol, 4,4'-isopropylidenebis(2-chlorophenol), 4,4'-isopropylidenebis(2-methylphenol), 4,4'-ethylenebis(2-methylphenol), 4,4'-thiobis(6-t-butyl-3-methylphenol).

Examples of binder agents that can be employed in the present invention are as follows:

Water-soluble organic polymers, such as polyvinyl alcohol, methoxy cellulose, hydroxyethyl cellulose, carboxymethyl cellulose, polyvinyl pyrrolidone, polyacrylamide, polystyrene, copolymer of vinyl chloride and vinyl acetate, and polybutylmethacrylate.

As mentioned previously, in the present invention, a thermosensitive coloring layer comprising a leuco dye, an acidic material and a binder agent, which can be respectively selected from the aforementioned leuco dyes, acidic materials and binder agents, is formed on a support sheet.

Further, on the top surface of the thermosensitive coloring layer, there is formed a front barrier layer, which serves to protect the thermosensitive coloring layer from intrusion thereinto of any adverse materials, such as plasticizers which decompose colored materials formed in the thermosensitive coloring layer, and which barrier layer comprises a water-soluble polymeric material.

Examples of water-soluble polymeric materials that can be employed in the present invention are as follows:

Polyvinyl alcohol, carboxymethyl cellulose, methyl cellulose, ethyl cellulose, hydroxymethyl cellulose, hydroxyethyl cellulose, hydroxypropyl cellulose, polyacrylamide, starch, gelatin, casein and polyvinyl pyrrolidone.

When preparing the barrier layer, one of the above-mentioned water-soluble polymeric materials is dissolved in water and that solution is coated with a uniform thickness on the thermosensitive coloring layer and is then dried. It is preferable that the thickness of the thus formed barrier layer be in the range from about 1 μm to about 10 μm, since it is extremely difficult to form a barrier layer uniformly with a thickness smaller than 1 μm, while when the thickness is greater than 10 μm, speedy heat transfer from the barrier layer to the thermosensitive coloring layer cannot be attained and the result is that comparatively great heat energy is required for thermosensitive recording and high-speed thermosensitive recording cannot be done.

The thus formed barrier layer can protect the thermosensitive coloring layer from intrusion thereinto of any adverse materials even if it is in direct contact with them for a prolonged period of time.

In contrast to this, when organic-solvent-soluble polymeric materials, such as polystyrene, are employed instead of the aforementioned water-soluble polymeric materials in the barrier layer, the barrier layer cannot protect the images formed in the thermosensitive coloring layer when the barrier layer is continuously in contact with the organic film and those images disappear within a whole day and night.

In this sense, the use of water-soluble polymeric materials in the barrier layers for the thermosensitive coloring layer is significant.

In order to improve that function of the barrier layer in the present invention, water-resisting-property-improvement agents, such as formaldehyde, glyoxal, chromium alum, melamine, melamine-formaldehyde resin, polyamide resin and polyamideepichlorohydrin resin, can be added in amounts ranging from 20 weight percent to 100 weight percent with respect to the water-soluble polymeric material contained in the barrier layer.

On the back side of the support sheet, there is formed a back barrier layer whose components are substantially the same as those of the front barrier layer.

On the back barrier layer, there is formed an adhesive layer which is made of at least one material selected from the group consisting of an SBR latex adhesive agent, an acrylic adhesive agent, a vinyl acetate adhesive agent and a rubber adhesive agent. For use in the labels for food products, the acrylic adhesive agent is suitable from the view point of safety.

A disposable backing sheet, which essentially consists of a base sheet and a non-sticking layer formed thereon comprising a silicone resin for facilitating the peeling of the backing sheet off the adhesive layer, is attached to the adhesive layer in such a manner that the non-sticking layer comes in contact with the adhesive layer. Thus, a thermosensitive recording adhesive label can be prepared. Image formation on the thermosensitive recording adhesive label can be done by any conventional thermosensitive recording means, for instance, by a conventional thermal recording head. When the label is used, the above-mentioned disposable backing sheet is peeled off the adhesive layer.

Furthermore, in the thermosensitive coloring layer, the following additives can be contained in the form of fine powder, which are useful in obtaining clear images:

Calcium carbonate, silica, alumina, magnesia, talc, barium sulfate and aluminum stearate.

Moreover, in order to improve the running of a thermal recording head along the thermosensitive recording adhesive label according to the present invention, the following lubricating materials can be added to the front barrier layer:

Linseed oil, tung oil, wax, paraffin, polyethylene wax, and chlorinated paraffin.

The front barrier layer and the back barrier layer can also be made of a carboxyl-group-modified polyvinyl alcohol.

Carboxyl-group-modified polyvinyl alcohols are (1) materials which are prepared by allowing polyvinyl alcohol to react with a carboxylic acid, such as fumaric acid, maleic acid and itaconic acid, or an anhydride, such as maleic anhydride, phthalic anhydride, trimellitic acid anhydride and itaconic anhydride; (2) materials which are prepared by esterification of the first mentioned reacted materials; and (3) materials prepared by polymerizing vinyl acetate and a relatively small amount of ethylenic unsaturated carboxylic acid, such as fumaric acid, maleic acid and itaconic acid, followed by saponification of the polymerized materials. The details of the preparation of carboxyl-group-modified polyvinyl alcohols are described in Japanese Patent Publication Ser. No. 45-21312, Japanese Laid-open Patent Application Ser. No. 53-91995, Japanese Laid-open Patent Application No. 54-28389, and Japanese Laid-open Patent Application Ser. No. 54-28390.

When a front barrier layer is formed on the thermosensitive coloring layer, using the above-mentioned carboxyl-modified-alcohol, the carboxyl-group-modified polyvinyl alcohol can be solely used by dissolving the same in an appropriate solvent and then by coating that solution on the thermosensitive coloring layer. Alternatively, the carboxyl-group-modified polyvinyl alcohol and a relatively small amount of polyamide resin, melamin resin, formalin, glyoxal or chromium alum are dissolved in an appropriate solvent and that solution is coated on the thermosensitive coloring layer. Thus, a barrier layer having high resistance against water is formed.

In particular, when the carboxyl-group-modified polyvinyl alcohol is used in combination with polyamide resin in the barrier layer, its water-resistance is significantly enhanced. It is preferable that the amount of the material to be used in combination with the carboxyl-group-modified polyvinyl alcohol be in the range from 0.2 parts by weight to 1.0 part by weight with respect to one part by weight of the carboxyl-group-modified polyvinyl alcohol. In the case of this barrier layer using the carboxyl-group-modified polyvinyl alcohol, it is preferable that its coated amount be in the range of about 0.5 g/m$^2$ to about 4.0 g/m$^2$ or its thickness be in the range of about 1 $\mu$m to about 10 $\mu$m.

This is because it is extremely difficult to form a barrier layer uniformly with a coated amount of less than 0.5 g/m$^2$ or with a thickness smaller than 1 $\mu$m, while when the coated amount is greater than 5.0 g/m$^2$ or the thickness is greater than 10 $\mu$m, speedy heat transfer from the barrier layer to the thermosensitive coloring layer is hindered and the result is that comparatively great heat energy is required for thermosensitive recording and high-speed thermosensitive recording cannot be done.

The barrier layer comprising the carboxyl-group-modified polyvinyl alcohol can be further improved with respect to its barrier performance and image retention capability by treating the barrier layer with an aqueous solution of aluminum sulfate, aluminum chloride, titanium chloride, ammonium chromium (III) sulfate, potassium manganese oxide or iron sulfate.

Referring to FIG. 1, an embodiment of a thermosensitive recording adhesive label according to the present invention will now be explained.

In FIG. 1, reference numeral 1 represents a support sheet. On the back side of the support sheet 1 there is formed a barrier layer 10 comprising a water-soluble polymeric material and other materials, for instance, a water-resisting-property-improvement agent.

Reference numeral 2 is an adhesive layer which is formed on the back barrier layer 10. To the adhesive layer 2 there is attached a disposable backing sheet 3 which comprises a base sheet 5 and a non-sticking layer 4 formed thereon so as to be in contact with the adhesive layer 2 when the label is not used. On the front side of the support sheet 1 there is formed a thermosensitive coloring layer 6 which comprises a colorless or light-colored leuco dye, an acidic material, a binder agent and other materials, the respective examples of which have been described. On the thermosensitive coloring layer 6, there is formed a front barrier layer 7 which comprises a water soluble polymeric material, a water-resisting-property-improving agent and other additives, the respective examples of which have also been described. Alternatively, the front barrier layer 7 comprises a carboxyl-group-modified polyvinyl alcohol and other additive as described previously. Furthermore, the front barrier 7 can contain one of the previously mentioned lubricating materials for facilitating the running of a thermal head along the surface of the label when thermosensitive recording is performed. When the label is used, a portion indicated by collective reference number 9, which includes the front barrier layer 7, the thermosensitive coloring layer 6, the support sheet 1, the back barrier layer 10 and the adhesive layer 2, is peeled off the disposable backing sheet 3.

Figure 2:
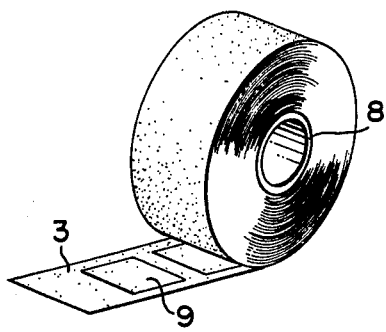
FIG. 2 is a perspective view of a roll of the thermosensitive recording adhesive labels according to the present invention.

Referring to FIG. 2, there is shown a perspective view of a roll of thermosensitive recording adhesive labels which are cut in an appropriate size and applied to a roll-shaped disposable backing sheet. In the figure, reference numeral 8 designates a core of that roll.

Embodiments of a thermosensitive recording adhesive label according to the present invention will now be described.

EXAMPLE 1

A dispersant A-1 and a dispersant B-1 were prepared separately by mixing the following components of each dispersant in a ball mill for 24 hours.

|  | (Parts by Weight) |
|---|---|
| Dispersant A-1 | |
| Crystal Violet Lacton | 1.5 |
| polyvinyl alcohol (20% aqueous solution) | 5.0 |

-continued

|  | (Parts by Weight) |
|---|---|
| Water | 43.5 |
| Dispersant B-1 | |
| Bisphenol A | 6.0 |
| Calcium carbonate | 3.0 |
| Stearic acid amide | 1.0 |
| Polyvinyl alcohol (20% aqueous solution) | 10.0 |
| Water | 30.0 |

The thus prepared dispersant A-1 and dispersant B-1 were mixed to prepared a thermosensitive coloring liquid for forming a thermosensitive coloring layer.

A dispersant C-1 was then prepared by mixing 5.0 parts by weight of polyvinyl alcohol and 95.0 parts by weight of water to form two barrier layers.

The thermosensitive coloring liquid was coated uniformly on a sheet of high quality paper (about 50 g/m$^2$) so as to form a thermosensitive coloring layer with a deposition of 5 g/m$^2$ of solid components thereof when the coated thermosensitive coloring layer was dried. When the thermosensitive coloring layer was completely dried, the dispersant C-1 was coated on the surface of the thermosensitive coloring layer, with a deposition of 2 g/m$^2$ of solid components thereof.

The dispersant C-1 was also coated on the back surface of the support sheet so as to form a back barrier layer with a deposition of 2.5 g/m$^2$ of solid components thereof when it was dried. An SBR type latex adhesive agent was then coated on the back barrier layer and a disposable backing sheet made of high quality paper (about 50 g/m$^2$) with a coating of a non-sticking silicone resin was applied to the SBR type latex adhesive agent layer, whereby a thermosensitive recording adhesive label according to the present invention was prepared.

Thermal printing was performed on the thermosensitive recording adhesive label by use of a heat gradient test apparatus (made by Toyo Seiki Co., Ltd.) at 150° C. with a pressure of 2 kg/cm$^2$ applied to the label for 1 second. The image density of the printed image measured 1.15 by a Macbeth reflection-type densitometer.

With the disposable backing sheet removed, the thermally printed label was applied to a polyvinylchloride resin wrapping film (manufactured by Shin-etsu Polymer Co., Ltd.) and the upper surface of the label was also covered with the wrapping film. Under this condition, the thermally printed label was allowed to stand for 24 hours to see if there was any change in printed image density. Hereinafter this test is referred to as the image durability test. The result was that no change in image density was observed and image density remained 1.15.

COMPARATIVE EXAMPLE 1-1

A comparative thermosensitive recording adhesive label was prepared under the same procedure as in Example 1 except that both the front barrier layer and the back barrier layer were omitted therefrom.

A thermally printed image with an image density of 1.16 was formed on the comparative thermosensitive recording label under the same procedure as in Example 1. The label was applied to the same polyvinylchloride resin wrapping film as employed in Example 1 and the upper surface of the label was also covered with the polyvinylchloride resin wrapping film. Under this condition, the thermally printed label was subjected to the image durability test with the label allowed to stand for 24 hours. After 24 hours, it was observed that the image density decreased from 1.16 to 0.34 and the printed image was illegible.

COMPARATIVE EXAMPLE 1-2

A comparative thermosensitive recording adhesive label was prepared under the same procedure as in Example 1 except that the back barrier layer only was omitted therefrom.

With a thermally printed image with an image density of 1.16 formed on this comparative thermosensitive recording adhesive label, the label was subjected to the same image durability test as in Example 1 with the label allowed to stand for 24 hours, under the conditions that the label was applied to the polyvinylchloride resin wrapping film and the upper surface thereof was covered with the same wrapping film.

The result was that after 24 hours, the image density decreased from 1.16 to 0.67, so that the initially printed image became difficult to read.

EXAMPLE 2

A dispersant A-2 and a dispersant B-2 were prepared separately by mixing the following components of each dispersant in a ball mill for 24 hours.

|  | (Parts by Weight) |
|---|---|
| Dispersant A-2 | |
| 3-diethyl-6-methyl-7-anilinofluoran | 1.5 |
| Polyvinyl alcohol (20% aqueous solution) | 5.0 |
| Water | 43.5 |
| Dispersant B-2 | |
| Bisphenol A | 6.0 |
| Stearic acid amide | 1.0 |
| Polyvinyl alcohol (20% aqueous solution) | 10.0 |
| Water | 33.0 |

The thus prepared dispersant A-2 and dispersant B-2 were mixed to prepare a thermosensitive coloring liquid for forming a thermosensitive coloring layer.

A dispersant C-2 was prepared by mixing the following components:

| Dispersant C-2 | (Parts by Weight) |
|---|---|
| Oxidized starch (20% aqueous solution) | 25.0 |
| Glyoxal (40% aqueous solution) | 11.4 |
| Ammonium chloride | 1.1 |
| Water | 62.5 |

The thermosensitive coloring liquid was coated uniformly on a sheet of high quality paper (about 50 g/m$^2$) so as to form a thermosensitive coloring layer with a deposition of 5 g/m$^2$ of solid components thereof when the coated thermosensitive coloring layer was dried. When the thermosensitive coloring layer was completely dried, the dispersant C-2 was coated on the surface of the thermosensitive coloring layer, with a deposition of 2 g/m$^2$ of solid components thereof.

The dispersant C-2 was also coated on the back surface of the support sheet so as to form a back barrier layer with a deposition of 2.5 g/m$^2$ of solid components thereof when it was dried. An SBR type latex adhesive agent was then coated on the back barrier layer and a disposal backing sheet made of high quality paper (about 50 g/m$^2$) with a coating of a non-sticking silicone resin was applied to the SBR type latex adhesive agent layer, whereby another thermosensitive recording adhesive label according to the present invention was prepared.

Thermal printing was performed on the thermosensitive recording adhesive label by use of a heat gradient test apparatus made by Toyo Seiki Co., Ltd.) at 150° C. with a pressure of 2 kg/cm$^2$ applied to the label for 1 second. The image density of the printed image measured 1.25 by a Macbeth reflection-type densitometer.

With the disposable backing sheet removed, the thermally printed label was applied to a polyvinylchloride resin wrapping film (manufactured by Shin-etsu Polymer Co., Ltd.) and the upper surface of the label was also covered with the wrapping film. Under this condition, the thermally printed label was allowed to stand for 24 hours to see if there was any change in printed image density. The result of this image durability test was that no change in image density was observed and the image density remained 1.25.

Furthermore, the thermosensitive recording adhesive label was subjected to a water resistance test by immersing the label in water for 5 minutes and then wiping the surface thereof with absorbent cotton five times. The result was that there was no change in image density and the thermosensitive coloring layer did not peel off the support sheet.

COMPARATIVE EXAMPLE 2

A comparative thermosensitive recording adhesive label was prepared under the same procedure as in Example 2 except that the back barrier layer only was omitted therefrom.

With a thermally printed image with an image density of 1.25 formed on this comparative thermosensitive recording adhesive label, the label was subjected to the same image durability test as in Example 2 by allowing the label to stand for 24 hours under the conditions that the label was applied to the polyvinylchloride resin wrapping film and the upper surface thereof was covered with the same wrapping film.

The result was the after 24 hours, the image density decreased from 1.25 to 0.87 so that the initially printed image became difficult to read.

EXAMPLE 3

In Example 1, the dispersant C-1 was replaced by a dispersant C-3 having the following components:

| Dispersant C-3 | (Parts by Weight) |
|---|---|
| Polyvinyl alcohol (20% aqueous solution) | 25.0 |
| Methylolmelamine (30% aqueous solution) | 3.2 |

A thermally printed image with an image density of 1.15 was formed on the thermosensitive recording adhesive label under the same procedure in Example 1. The same polyvinylchloride resin wrapping film as employed in Example 1 was superimposed on the upper surface of the label and the thermally printed label was subjected to the image durability test with the label allowed to stand for one week under that condition. After one week, no change in image density was observed.

The surface of the thermosensitive recording adhesive label was partially wetted with several drops of water and coated paper was superimposed on the wet side of the label in close contact therewith in an atmosphere of relatively low humidity for a whole day and night. No sticking of the label to the coated paper took place.

EXAMPLE 4

A dispersant A-4 and a dispersant B-4 were prepared separately by mixing the following components of each dispersant in a ball mill for 24 hours. The dispersant A-4 and B-4 are respectively the same as the dispersant A-1 and B-1 employed in Example 1.

|  | (Parts by Weight) |
|---|---|
| Dispersant A-4 | |
| Crystal Violet Lacton | 1.5 |
| Polyvinyl alcohol (20% aqueous solution) | 5.0 |
| Water | 43.5 |
| Dispersant B-4 | |
| Bisphenol A | 6.0 |
| Calcium carbonate | 3.0 |
| Stearic acid amide | 1.0 |
| Polyvinyl alcohol (20% aqueous solution) | 10.0 |
| Water | 30.1 |

The thus prepared dispersant A-4 and dispersant B-4 were mixed to prepare a thermosensitive coloring liquid for forming a thermosensitive coloring layer.

The thermosensitive coloring liquid was coated uniformly on a sheet of high quality paper (about 50 g/m$^2$) so as to form a thermosensitive coloring layer with a deposition of 5 g/m$^2$ of solid components thereof when the coated thermosensitive coloring layer was dried.

When the thermosensitive coloring layer was completely dried, a dispersant C-4 having the following composition was coated on the surface of the thermosensitive coloring layer, with a deposition of 2 g/m$^2$ of solid components thereof when dried.

| Dispersant C-4 | (Parts by Weight) |
|---|---|
| Itaconic-acid-modified-polyvinyl alcohol | 5.0 |
| Water | 95.0 |

A dispersant D-4 comprising the following components was coated on the dispersant C-4 layer in order to subject the C-4 layer to aluminum ion processing.

| Dispersant D-4 | (Parts by Weight) |
|---|---|
| Aluminum sulfate | 2.0 |
| Water | 98.0 |

A dispersant E-4 having the following components was coated on the back side of the support sheet, with a deposition of 1.5 g/m$^2$ when dried, whereby a back barrier layer was formed.

| Dispersant E-4 | (Parts by Weight) |
|---|---|
| alcohol | 5.0 |
| Water | 95.0 |

An SBR type latex adhesive agent was then coated on the back barrier layer and a disposable backing sheet made of high quality paper (about 50 g/m$^2$) with a coating of a non-stick silicone resin was applied to the SBR type latex adhesive agent layer, whereby a thermosensitive recording adhesive label according to the present invention was prepared.

Thermal printing was performed on the thermosensitive recording adhesive label by use of a heat gradient test apparatus (made by Toyo Seiki Co., Ltd.) at 150° C. with a pressure of 2 kg/cm$^2$ applied to the label for 1 second. The image density of the printed image measured more than 1.13.

The same polyvinyl chloride resin wrapping film as employed in Example 1 was superimposed on the upper surface of the label and the thermally printed label was subjected to the image durability test with the label allowed to stand for 24 hours under that condition. The image density decreased by less than 0.05, and this did not cause any practical problem with respect to image density.

EXAMPLE 5

In Example 4, the dispersant C-4 only was replaced by a dispersant C-5 having the following components:

| Dispersant C-5 | (Parts by Weight) |
| --- | --- |
| Maleic-acid modified polyvinyl alcohol | 5.0 |
| 30% amide resin aqueous solution | 4.0 |
| Water | 91.0 |

In exactly the same manner as in Example 4, a thermosensitive recording adhesive layer was prepared and an image durability test was conducted in the same manner as in Example 4. The test result was the same as that in the case of Example 4.

COMPARATIVE EXAMPLE 5-1

In Example 5, a comparative thermosensitive recording adhesive label was prepared under the same procedure as in Example 5 except that no front barrier layer was formed.

An image durability test was conducted in the same manner as in Example 5, which indicated that the image density was reduced by 0.7 during a period of 24 hours. This label cannot be used in practice.

COMPARATIVE EXAMPLE 5-2

In Example 5, a comparative thermosensitive recording adhesive label was prepared under the same procedure as in Example 5 except that the front barrier layer was formed by a dispersant C-5-2 comprising the following components:

| Dispersant C-5-2 | (Parts by Weight) |
| --- | --- |
| Polyvinyl alcohol | 5.0 |
| Water | 95.0 |

An image durability test was conducted in the same manner as in Example 5, which indicated that the image density was reduced by 0.7 during a period of 24 hours. This label cannot be used in practice.

EXAMPLE 6

A dispersant A-6 and a dispersant B-6 were prepared separately by mixing the following components of each dispersant in a ball mill for 24 hours.

| | (Parts by Weight) |
| --- | --- |
| Dispersant A-6 | |
| 3-diethyl-6-methyl-7-anilinofluoran | 1.5 |
| Polyvinyl alcohol (20% aqueous solution) | 5.0 |
| Water | 43.5 |
| Dispersant B-6 | |
| Bisphenol A | 6.0 |
| Calcium Carbonate | 3.0 |
| Stearic acid amide | 1.0 |
| Polyvinyl alcohol (20% aqueous solution) | 10.0 |
| Water | 30.0 |

The thus prepared dispersant A-6 and dispersant B-6 were mixed to prepare a thermosensitive coloring liquid for forming a thermosensitive coloring layer.

A dispersant C-6, comprising the following components:

| Dispersant C-6 | (Parts by Weight) |
| --- | --- |
| Itaconic-acid-modified polyvinyl alcohol | 5.0 |
| Polyethylene wax (40% solid) | 1.0 |
| Water | 94.0, | was prepared by completely dissolving itaconic-acid-modified polyvinyl alcohol in water and then adding polyethylene wax to the mixture and mixing the same with stirring until it became homogeneous.

The thermosensitive coloring liquid was coated uniformly on a sheet of high quality paper (about 50 g/m) so as to form a thermosensitive coloring layer with a deposition of 7 g/m$^2$ of solid components thereof when the coated thermosensitive coloring layer was dried. When the thermosensitive coloring layer was completely dried, the dispersant C-6 was coated on the surface of the thermosensitive coloring layer, with a deposition of 2 g/m$^2$ of solid components thereof, forming a front barrier layer.

The dispersant C-6 was also coated on the back surface of the support sheet so as to form a back barrier layer with a deposition of 2.0 g/m$^2$ of solid components thereof when it was dried. An acrylic resin copolymer adhesive agent (manufactured by Toa Gosei Chemical Industry Co., Ltd. under the trade name of A 2406H) was then coated with a thickness of 20 μm on the non-sticking side of a disposal backing sheet made of high quality paper (about 50 g/m$^2$) with a coating of a non-sticking silicone resin. The thus formed adhesive layer was applied to the back barrier layer under application of pressure, whereby a further embodiment of a thermosensitive recording adhesive label according to the present invention was prepared.

Thermal printing was performed on the thermosensitive recording adhesive label by use of a heat gradient test apparatus made by Toyo Seiki Co., Ltd.) at 150° C. with a pressure of 2 kg/cm$^2$ applied to the label for 1 second. The image density of the printed image measured 1.23 by a Macbeth reflection-type densitometer.

With the disposable backing sheet removed, the thermally printed label was applied to a polyvinylchloride resin wrapping film (manufactured by Shin-etsu Polymer Co., Ltd.) and the upper surface of the label was also covered with the wrapping film. Under this condition, the thermally printed label was allowed to stand for 24 hours to see if there was any change in printed image density. The result of this image durability test was that no change in image density was observed and the image density remained 1.23.

What is claimed is:

1. A thermosensitive recording adhesive label comprising:
   a support sheet;
   a thermosensitive coloring layer formed on the front side of said support sheet, said thermosensitive coloring layer comprising a colorless or light-colored leuco dye and an acidic material capable of coloring said leuco dye when heat is applied thereto;
   a front barrier layer formed on said thermosensitive coloring layer, said front barrier layer comprising a water-soluble polymeric material capable of preventing intrusion of materials which may discolor said thermosensitive coloring layer;
   a back barrier layer formed on the back side of said support sheet, said back barrier layer comprising a water-soluble polymeric material capable of preventing intrusion of materials which may discolor said thermosensitive coloring layer;
   an adhesive layer formed on said back barrier layer; and
   a disposable backing sheet which is attached to said adhesive layer and can be peeled off said adhesive layer when said thermosensitive recording adhesive label is used.

2. A thermosensitive recording adhesive label as claimed in claim 1, wherein said polymeric material contained in said front barrier layer and said back barrier layer further comprises a water-resisting-property-improvement agent.

3. A thermosensitive recording adhesive label as claimed in claim 2, wherein said water-resisting-property-improvement agent is one member selected from the group consisting of formaldehyde, glyoxal, chromium alum, melamine, melamineformaldehyde resin, polyamide resin and polyamideepichlorohydrin resin.

4. A thermosensitive recording adhesive label as claimed in claim 2, wherein the amount of said water-resisting-property-improvement agent ranges from 20 weight percent to 100 weight percent with respect to said water-soluble polymeric material contained in each of said front barrier layer and said back barrier layer.

5. A thermosensitive recording adhesive label as claimed in claim 1, wherein said polymeric material contained in said front barrier layer and said back barrier layer is a carboxyl-group-modified polyvinyl alcohol.

6. A thermosensitive recording adhesive label as claimed in claim 5, wherein said carboxyl-group-modified polyvinyl alcohol is one member selected from the group consisting of:
   (1) materials which are prepared by reacting polyvinyl alcohol with a carboxylic acid or an anhydride;
   (2) materials which are prepared by esterification of the reacted materials of (1); and
   (3) materials prepared by polymerizing vinyl acetate and a relatively small amount of ethylenic unsaturated carboxylic acid, followed by saponification of the polymerized materials.

7. A thermosensitive recording adhesive label as claimed in claim 5, wherein at least one of said front barrier layer and said back barrier layer further comprises polyamide resin in an amount ranging from 0.2 parts by weight to 1.0 part by weight with respect to one part by weight of said carboxyl-group-modified polyvinyl alcohol.

8. A thermosensitive recording adhesive label as claimed in claim 1, wherein said polymeric material contained in said front barrier layer is a carboxyl-group-modified polyvinyl alcohol.

9. A thermosensitive recording adhesive label as claimed in claim 8, wherein said carboxyl-group-modified polyvinyl alcohol is one member selected from the group consisting of:
   (1) materials which are prepared by reacting polyvinyl alcohol with a carboxylic acid or an anhydride;
   (2) materials which are prepared by esterification of the reacted materials of (1); and
   (3) materials prepared by polymerizing vinyl acetate and a relatively small amount of ethylenic unsaturated carboxylic acid, followed by saponification of the polymerized materials.

10. A thermosensitive recording adhesive label as claimed in claim 8, wherein said front barrier layer is treated with an aqueous solution of aluminum sulfate, aluminium chloride, titanium chloride, ammonium chromium (III) sulfate, potassium manganese oxide or iron sulfate.

11. A thermosensitive recording adhesive label as claimed in claim 1, wherein said adhesive layer comprises at least one adhesive agent selected from the group consisting of an SBR latex adhesive agent, an acrylic adhesive agent, a vinyl acetate adhesive agent and a rubber adhesive agent.

12. A thermosensitive recording adhesive label as claimed in claim 1, wherein said disposable backing sheet comprises a base sheet and a non-sticking layer which facilitates peeling of said adhesive layer off said disposable backing sheet.

13. A thermosensitive recording adhesive label as claimed in claim 1, wherein said water-soluble polymeric material is one member selected from the group consisting of polyvinyl alcohol, carboxymethyl cellulose, methyl cellulose, ethyl cellulose, hydroxymethyl cellulose, hydroxyethyl cellulose, hydroxypropyl cellulose, polyacrylamide, starch, gelatin, casein and polyvinyl pyrrolidone.

14. A thermosensitive recording adhesive label as claimed in claim 1, wherein the thickness of said front barrier layer is in the range from about 1 $\mu$m to about 10 $\mu$m.

15. A thermosensitive recording adhesive label as claimed in claim 1, wherein said thermosensitive coloring layer further comprises at least one member selected from the group consisting of calcium carbonate, silica, alumina, magnesia, talc, barium sulfate and aluminum stearate.

16. A thermosensitive recording adhesive label as claimed in claim 1, wherein said front barrier layer further comprises a lubricating material.

* * * * *